April 30, 1929.   N. F. HIGGINS   1,711,316
COTTON PICKER
Filed April 27, 1927    3 Sheets-Sheet 1

April 30, 1929.  N. F. HIGGINS  1,711,316

COTTON PICKER

Filed April 27, 1927   3 Sheets-Sheet 3

Inventor
Nicholas F. Higgins

Patented Apr. 30, 1929.

1,711,316

UNITED STATES PATENT OFFICE.

NICHOLAS F. HIGGINS, OF CHICAGO, ILLINOIS.

COTTON PICKER.

Application filed April 27, 1927. Serial No. 186,843.

This invention relates in general to cotton pickers and has particular reference to a pneumatic apparatus which is adapted to traverse a row of cotton plants preferably under its own power for picking the cotton from the plants.

The primary object of the invention is to provide a mobile cotton picking machine which may be placed in operation under the control of one operator and which can be caused to travel a cotton row and pick the cotton from the plants by which end a saving of labor is effected.

Further objects of the invention will appear as the description now proceeds with reference to the accompanying drawings in which:—

Figure 1:
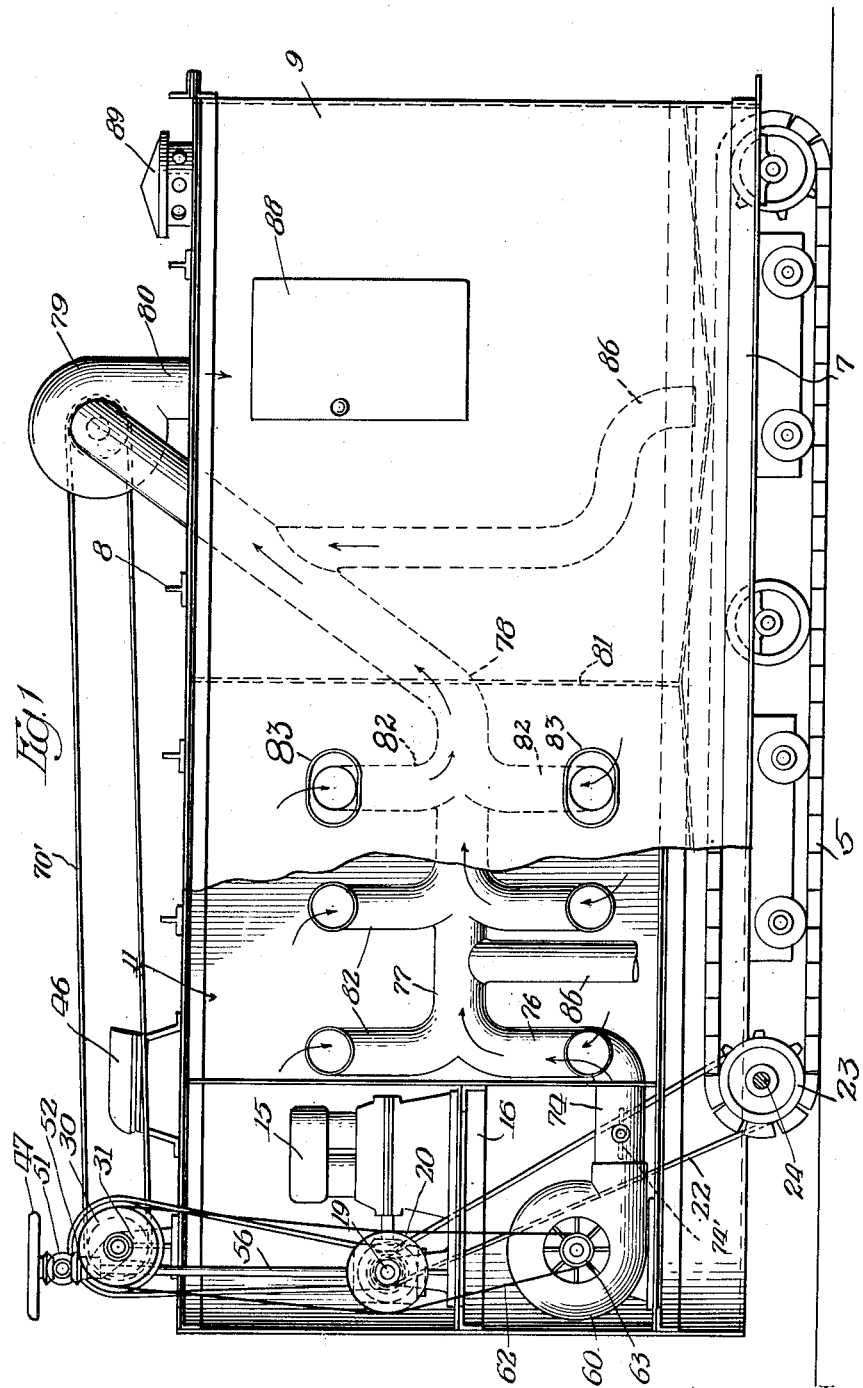
Fig. 1 is a view in side elevation of the machine with a portion of the housing broken away to show a part of the interior thereof.
Figure 3:
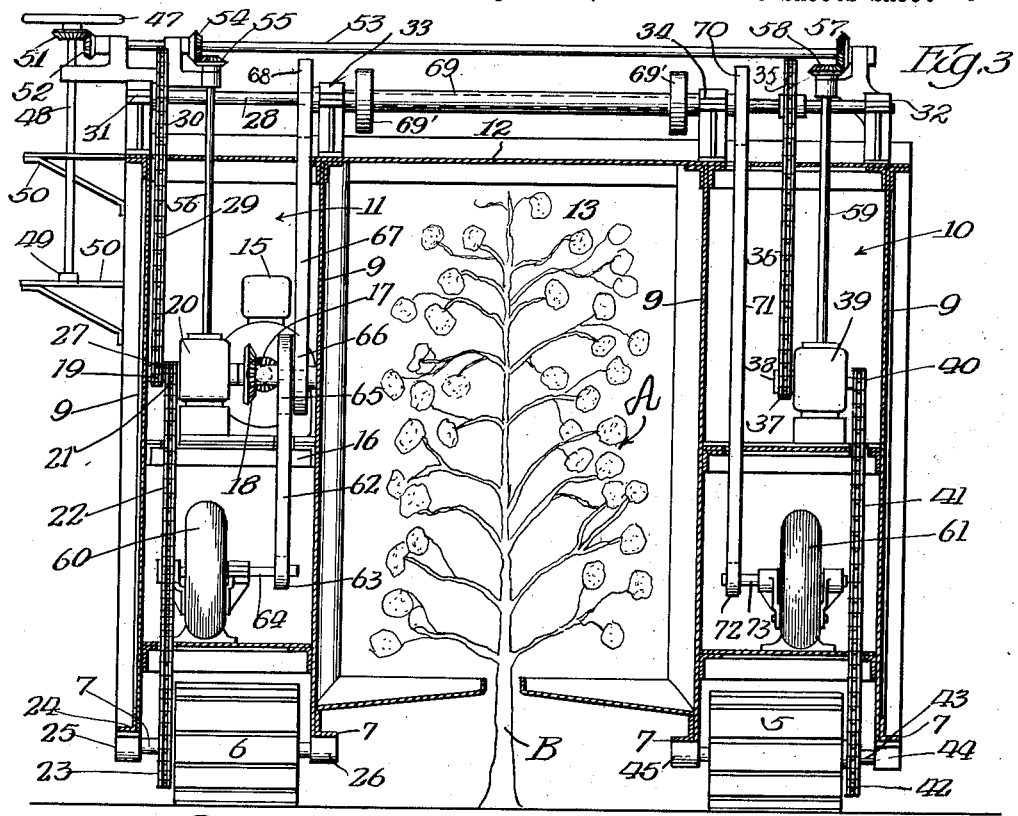
Figure 4:
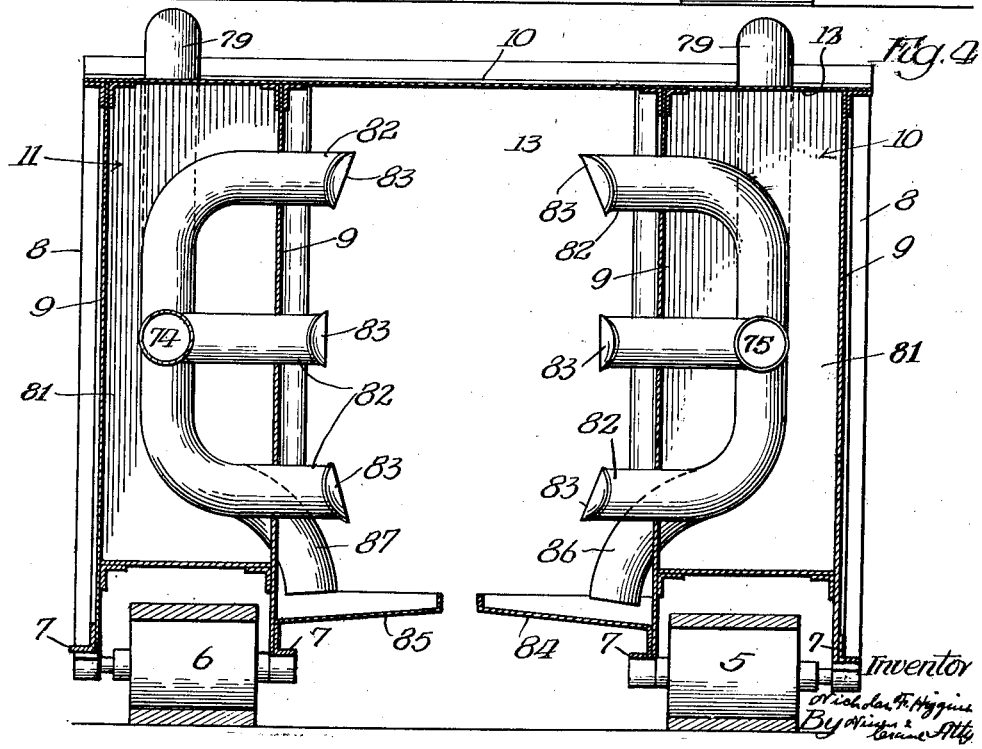

Fig. 3 is a cross-section of the machine taken along a vertical line just to the left of the blower 60 in Fig. 1 and is a view looking from the left of said figure; and Fig. 4 is a view in vertical section through the middle of the machine.
I would prefer to construct the machine as a self-propelled vehicle and somewhat along the lines of a tractor of the track-laying type although of course it may be made on wheels, and instead of being self-propelled, it may be operated as a trailer. These modified forms are mentioned simply as possibilities but I do not believe that they would prove as satisfactory from every point of view as a self-propelled machine and one in which track-layers are employed for traction purposes.

Proceeding in this manner, I provide a pair of track-layers 5 and 6 on which the frame structure of the machine is mounted.
The mounting may comprise a chassis structure modified to meet the present requirements and comprising, as an example, a base structure 7 made up for the most part of angle irons, and in this connection, I would suggest that the angle irons extend along the side and the rear and front of each of the track-layers 5 and 6. This will provide a separate base on each track-layer. I provide this separate base for each track-layer since the machine is made up in two separate units, each unit being mounted over each of the track-layers 5 and 6. The purpose of this double unit structure will be presently described. Projecting upwardly on each base 7 are series of spaced angle irons 8 providing upright frame members for the sheet metal siding 9. The frame members and siding are arranged along both sides of the machine and on the inside of each track-layer so as to provide two separate housing units 10 and 11. A sheet metal roof or deck structure 12 is provided for each of the units 10 and 11 and angle iron frame members similar to those used on the sides are employed for supporting the roof. The roof in this respect extends across the top of the space 13 provided between the units 10 and 11. The ends of the units may be covered with the sheet metal siding in the same manner as the sides. It will thus be seen that each of the units 10 and 11 is an elongated boxlike housing with a space 13 provided between the same.

Figure 2:
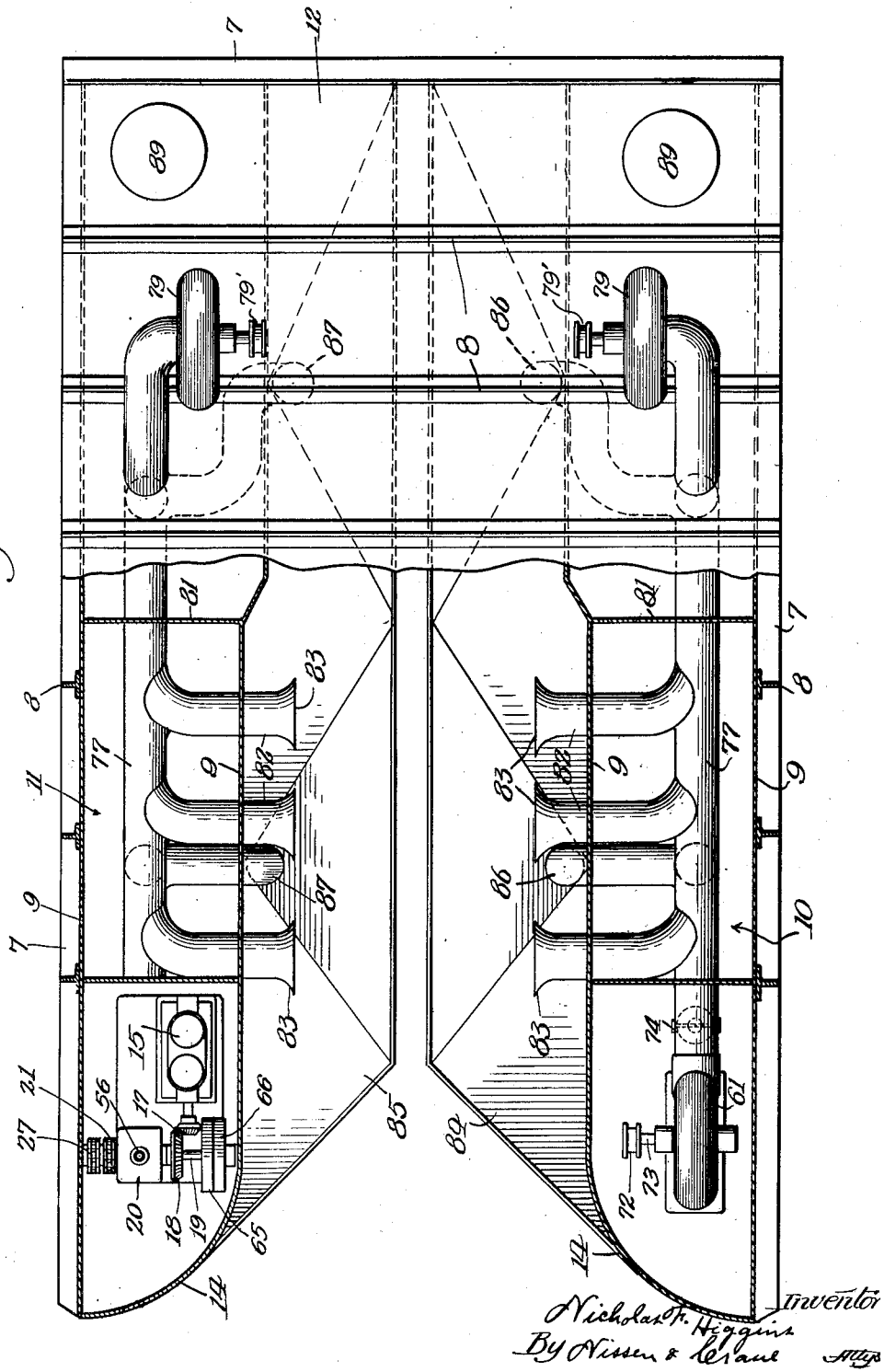
Fig. 2 is a top plan view of the machine with parts broken away to show the interior thereof.

Now the idea is to straddle a cotton row with the machine and run the machine along the row with the cotton plants passing into the open front of the space 13 and out the open rear thereof. In other words, the space 13 is unobstructed so far as concerns an unobstructed passage for accommodating the cotton plants as the machine is propelled down the row. In order to guide or direct the cotton plants into the space 13 or at least to make as wide an opening as possible into the space 13, the forward inside corners of each unit 10 and 11 is rounded off, as thus illustrated at 14 in Fig. 2.

The drive for the track-layers 5 and 6 may follow out a conventional form in principle but it has been necessary to modify this principle in certain particulars in order to accommodate it to the machine. In this connection, I may employ any suitable type of power unit, such, for instance, as an internal combustion engine 15, the same being supported in one of the units 10 or 11. I have selected the unit 11 on the right hand side of the machine. The engine is supported on a platform 16 in the forward end of the unit at about midway of the height thereof. The drive from the engine 15 may be taken off the engine shaft thereof by a gear 17 which is arranged in constant mesh with a gear 18 on a transverse shaft 19. The change speed mechanism 20 is associated with the shaft 19, the purpose of which will be hereinafter described. On the end of the shaft 19 is a sprocket wheel 21 with a sprocket chain 22 passing around the sprocket wheel 21 and around a larger sprocket wheel 23 on the shaft 24 of the track-layer 6. The opposite ends of the shaft 24 are properly journaled in the bearings 25 and 26. Co-axially mounted on the shaft 19 with respect to the sprocket wheel 21 is a sprocket wheel 27, the same being connected in driving relation with the shaft 28 by the sprocket chain 29 and the sprocket wheel 30. The shaft 28 is thus driven and the same extends transversely across the machine and is journaled in end bearings 31 and 32 with intermediate bearings 33 and 34 also provided. Mounted on the shaft 28 above the unit 10 is a sprocket wheel 35. This wheel is connected by a sprocket chain 36 to the sprocket 37 on the shaft 38 of another change speed mechanism 39. On the opposite end of the shaft 38 is a sprocket 40 and a sprocket chain 41 passes around the sprocket 40 and a larger sprocket 42 on the shaft 43 of the track-layer 5. The shaft 43 is journaled in the bearings 44 and 45 as explained with reference to the shaft 24 of the track-layer 6.

Positioned on the machine adjacent the driver's seat 46 is a steering wheel 47, the vertical shaft 48 thereof being mounted with freedom of rotation in an end bearing 49 mounted on one of the brackets 50, the other bracket 50 supporting the shaft from the side of the machine. A gear 51 is in constant mesh with a pinion gear 52 on the end of the transverse shaft 53 so that by turning the wheel 35 in one direction, it will rotate the shaft 53 clockwise, as an example. By turning the wheel in the opposite direction, the shaft 53 will be turned in an anti-clockwise direction. Fixed to the shaft 53 is a beveled gear arrangement similar to the gears 51 and 52. In this instance, however, the gear 54 is in mesh with the gear 55 on the shaft 56, leading to the change speed mechanism 20. A similar arrangement of gears 57 and 58 and a shaft 59 is provided for actuating the change speed mechanism 39. The wheel 47 with its co-operating gears and shafts is used for steering in the following manner: by turning the wheel to the right, the change speed mechanism 20 will be actuated so that the reduction gearing therein will impart a low speed to the track-layer 6, slowing the same down to such an extent that the higher speed of the track-layer 5 will turn the machine to the right. When the low speed change is imparted to the track-layer 6, the change speed mechanism 39 for the track-layer 5 is simultaneously effected so that the drive to the track-layer 5 is speeded up. Steering to the left is effected by turning the wheel 35 to the left so that this time a slow speed will be imparted to the track-layer 5 and a high speed to the track-layer 6. This steering arrangement is the identical same principle as that ordinarily employed in any tractor. The details here have been modified only to an extent as to accommodate the mechanism to the layout of the machine.

Supported on the floor of each of the units 10 and 11 are fan blowers 60 and 61, the same being operated from the engine 15. The drive to the blower 60 comprises a belt 62 which connects a pulley wheel 63 on the fan shaft 64 with a pulley wheel 65 on the power shaft 19. The pulley 65 is larger than the pulley 63 so as to operate the fan 60 at a comparatively high rate of speed. Also mounted on the shaft 19 adjacent the wheel 65 is a similar wheel 66 which is connected by the belt 67 to a wheel 68 on the tubular shaft 69. The shaft 28 passes through the tubular shaft 69 so that the drive to the fans and the track-layers, although derived from a common source, is separate and apart. The shaft 69 is journaled in the bearings 33 and 34 and terminates just beyond the bearing 34 with a pulley wheel 70 mounted thereon. This wheel 70 is connected by the belt 71 to the small wheel 72 on the shaft 73 of the fan 61. It will thus be seen that both blowers are driven at the same rate of speed from the engine 15 without interference from the drive to the track-layers or the steering mechanism.

Connected to the blowers 60 and 61 are pipes 74 and 75 each of which extend longitudinally of the unit housings 10 and 11 and embody in their construction an upwardly extending section 76 which terminates in a horizontal section 77 which continues to the bend 78 and then upwardly through the top of the housing into the side of a suction fan 79. The suction fans 79 have downwardly depending discharges 80. These discharges communicate through the top of the unit housing into separated collection receptacle formed on the housing by dividing off the rear parts thereof with vertical partition walls 81. The upwardly projecting sections of the pipes from the bends 78 go through openings in the partition walls 81. The drive for the suction fans 79 is taken off the hollow shaft 69 by the pulleys 69' each of which has a belt drive 70' to the flanged pulley 79' on each of the fan shafts. Branching outwardly from each pipe section 77 are a plurality of sections 82, the ends of which are provided with funnel-shaped or outwardly flaring rims 83. The two sets of branch sections project through openings in the side walls 9 of the unit housing and are so distributed in the space 13 as to come in intimate contact with the cotton plants A passing through the space. The communications between the branches 82 and the manifold sections of the pipes 74 and 75 are disposed at such an angle that the air force created by the blowers and the suction developed by the fans 79 will create a strong suction in the branches 82 so that the cotton on the plant A will be stripped from the plant by suction and carried into the branches 82, into the pipes, and discharged into the collection receptacles with which the discharge ends 80 of the fans 79 communicate. It is highly desirable to employ as many branch pipe sections for the space 13 as may be conveniently accommodated because the cotton on the plants must come into reasonably close contact with the suction ends of the branches in order to be stripped from the plant, and unless there are enough branches projecting into the space 13, some of the cotton will be missed.

In the event that any of the cotton stripped from the plant does not get into the pipe branches 82 but falls to the bottom of the space, it will be collected by the pan sections 84 and 85. These pan sections are suitably secured to the side walls of the unit housings 10 and 11 and project into the space 13 so that their ends are disposed in spaced confronting relation, the space thus providing accommodation for the stems B of the cotton plants. The bottom surfaces of the pan sections 84 and 85 (as shown to best advantage in Fig. 2) are slanting in such a way as to leave lowermost levels in restricted areas of the surface. Disposed above these restricted surface areas are two downwardly depending pipe sections 86 and two similar corresponding pipe sections 87 leading into the pipes 74 and 75, respectively, one pipe section 86 and one pipe section 87 being near the front of the apparatus and the remaining pipe sections 86 and 87 being beneath the collection receptacles in the rear of the apparatus. The last-mentioned sections 86 and 87 are connected to the pipes 74 and 75, respectively, beyond the bends 78. It is, of course, understood that one set is arranged for each of the housing units 10 and 11.

Dampers 74' are mounted in the pipes 74 and 75 so that the blowers 60 and 61 may be closed off. In this event, the suction fans 79 alone will function to develop the required suction in the pipes. If the force is not sufficient for any reason, the dampers may be opened so that the blowers may co-operate with the suction fans to increase the volume and velocity of the suction in the pipes.

Each of the collection receptacles is equipped with a door which is provided on the outside of the siding 9, as shown at 88, so that access may be had to the receptacles for removing the cotton collected therein. A relief vent 89 is also provided for exhausting the air from the receptacles.

The operation of the machine is substantially as follows: The operator, taking his place on the seat 46, may use the wheel 47 to steer the machine so that it straddles a row of cotton and with the fans running, the cotton plants, as they pass the branch pipe sections 82, will be stripped of the cotton and the cotton collected in the receptacle in the rear of the machine. As stated, any cotton that falls in the pans 84 and 85 will be picked up by the downwardly depending pipe sections 86 and 87 and carried into the main pipes where it will also be discharged into the collection receptacles. The apparatus requires only one operator and the operation and arrangement of the mechanism is positive so that there is nothing to get out of order or require any more attention than would be expected in operating any simple piece of machinery.

The operation of the machine need only be delayed long enough to empty the collection receptacles when they become full so as to make room for more cotton.

The type of machine shown in the drawings is simply illustrative of the principles that may be carried out to reduce the invention to practice and I do not care to be confined to the particular style shown as various changes may be made without departing from the spirit of the invention as defined by the sub-joined claims.

It is to be understood that as many branch pipes may project into the space 13 as is found to be necessary and in this connection, some of them may enter the space from the top instead of from the sides alone. Further, the number of fans and blowers may be increased as required.

Obviously those skilled in the art may make various changes in the details and arrangement of parts without departing from the spirit of the invention defined by the sub-joined claims, and it is therefore desired not to be restricted to the precise construction herein disclosed.

I claim:—

1. In a pneumatic cotton picking machine, a collection receptacle, a cotton delivery pipe having one end communicating with said receptacle, a suction device in said pipe adjacent said receptacle, a fan blower at the opposite end of said delivery pipe, and a plurality of elbow cotton-picking pipes branching from said delivery pipe between the suction device and the fan blower.

2. In a pneumatic cotton picking machine, a collection receptacle, a cotton delivery pipe having one end communicating with said receptacle, a suction device in said pipe adjacent said receptacle, a fan blower at the opposite end of said delivery pipe, and a plurality of elbow cotton-picking pipes branching from said delivery pipe between the suction device and the fan blower with the bends in the elbows thereof deflected in the direction that the delivery pipe communicates with the collection receptacle.

3. In a pneumatic cotton picking machine, a frame structure adapted to straddle a cotton row with sides and top defining an open-ended passage through which the cotton plants pass as the machine traverses a cotton row, pneumatic cotton picking means projecting into said passage from the sides thereof, a longitudinally divided pan structure presented across the bottom of said passage for collecting any of the cotton falling upon the same, and suction pipes disposed over said pan for collecting the cotton from said pan.

4. A cotton picking machine comprising a relatively long frame structure divided longitudinally to provide an elongated unobstructed center passage for accommodating a row of cotton plants with the machine straddling said row, a plurality of suction pipe sections on the machine communicating with said center passage adjacent the forward end thereof for picking the cotton on the plants by suction as the plants pass therethrough, and a pan made in divided sections located at the bottom of said center passage having a longitudinal space between said sections to accommodate the stems of cotton plants passing through the passage, some of the suction pipes terminating with their intake ends immediately over said pan sections.

In testimony whereof I have signed my name to this specification on this 25th day of April, A. D. 1927.

NICHOLAS F. HIGGINS.